United States Patent
Hsu et al.

(10) Patent No.: US 8,116,903 B2
(45) Date of Patent: Feb. 14, 2012

(54) CONTROL SYSTEM AND METHOD FOR DISPLAY OF INJECTION MOLDING MACHINE

(75) Inventors: Hsuan-Hung Hsu, Taipei Hsien (TW); Hsing-Chang Liu, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 517 days.

(21) Appl. No.: 12/346,892

(22) Filed: Dec. 31, 2008

(65) Prior Publication Data
US 2010/0168898 A1 Jul. 1, 2010

(30) Foreign Application Priority Data
Dec. 30, 2008 (CN) .......................... 2008 1 0306675

(51) Int. Cl.
*G06F 19/00* (2011.01)
(52) U.S. Cl. ........ 700/204; 700/200; 700/203; 700/306; 715/771
(58) Field of Classification Search .................. 700/108, 700/203, 204, 109, 200, 306; 715/772, 809, 715/700
See application file for complete search history.

(56) References Cited

U.S. PATENT DOCUMENTS

| | | | | | |
|---|---|---|---|---|---|
| 4,823,274 | A | * | 4/1989 | Kiya et al. | 700/203 |
| 5,344,301 | A | * | 9/1994 | Kamiguchi et al. | 425/169 |
| 5,470,218 | A | * | 11/1995 | Hillman et al. | 425/144 |
| 5,995,009 | A | * | 11/1999 | Yonezawa et al. | 340/635 |
| 6,258,303 | B1 | * | 7/2001 | Hibi et al. | 264/40.5 |
| 6,980,882 | B2 | * | 12/2005 | Yamazaki et al. | 700/200 |
| 7,534,378 | B2 | * | 5/2009 | Smith | 264/40.1 |
| 7,551,976 | B2 | * | 6/2009 | Arima et al. | 700/108 |
| 7,890,880 | B2 | * | 2/2011 | Hehl | 715/771 |
| 2004/0093115 | A1 | * | 5/2004 | Usui et al. | 700/204 |
| 2006/0235568 | A1 | * | 10/2006 | Araki et al. | 700/200 |
| 2009/0012656 | A1 | * | 1/2009 | Uchiyama et al. | 700/306 |
| 2009/0119670 | A1 | * | 5/2009 | Yamada et al. | 718/102 |

* cited by examiner

*Primary Examiner* — Dave Robertson
(74) *Attorney, Agent, or Firm* — Altis Law Group, Inc.

(57) ABSTRACT

A control system for controlling the display of an injection molding machine (IMM) includes a human machine interface (HMI), a driver, a controller, a timer, and a time display module. The controller controls the driver to drive the IMM to do a plurality of operations. The time display module controls the HMI to display working times of operations that have been done, and the working time of an operation that is in process in the current work cycle. The timer records working time of each operation by starting to time at the beginning of each operation, and stopping timing at the end of each operation.

13 Claims, 4 Drawing Sheets

CONTROL SYSTEM AND METHOD FOR DISPLAY OF INJECTION MOLDING MACHINE

BACKGROUND

1. Technical Field

The present disclosure relates to control systems and methods and, particularly, to a control system and a method for controlling display of an injection molding machine.

2. Description of Related Art

For improving efficiency of an injection molding machine, working time of the injection molding machine's operations often need to be adjusted. Normally, a plurality of operations in last work cycle should be analyzed as a whole before adjustment to generate an adjustment standard. However, most existing methods only control injection molding machines to display work time of a current operation, but do not provide work time of other operations for users to analyze the plurality of operations as a whole, which is inconvenient for users, and reduces efficiency of the injection molding machines.

DETAILED DESCRIPTION

Figure 1:
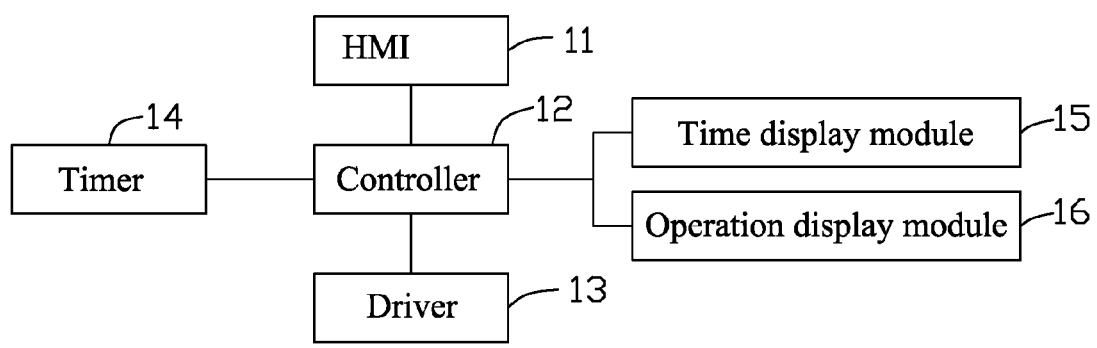
FIG. 1 is a block diagram of an exemplary embodiment of a control system for controlling display of an injection molding machine.

Referring to FIG. 1, an exemplary embodiment of a control system for controlling display of an injection molding machine (IMM) includes a human machine interface (HMI) 11, a controller 12, a driver 13, a timer 14, a time display module 15, and an operation display module 16. The controller 12 stores a controlling procedure to control the driver 13 to drive the IMM to do a plurality of operations. In one embodiment, the plurality of operations includes, for example, a mold closing operation, a nozzle advance operation, an ejection operation, a pressure hold operation, a metering operation, a mold opening operation, a chip operation, an ejector advance operation, and a knocking out operation, wherein the chip operation is an auxiliary operation for changing working times of other operations A work cycle for the IMM is defined as a period time in which the IMM finishes the plurality of operations. The timer 14 records working time of each operation by starting to time at the beginning of each operation, and stopping timing at the end of each operation. The time display module 15 controls the HMI 11 to display a time coordinate axis, and working time of operations that have been done and an operation that is in process in a current work cycle according to time order in the coordinate axis. The operation display module 16 controls the HMI 11 to display operations that have been done and an operation that is in process in a current work cycle according to time order in the coordinate axis.

The time display module 15 can control the HMI 11 to display working time of the plurality of operations in two adjacent work cycles in two time coordinate axes at the same time, such as a last work cycle and a current work cycle. If the plurality of operations in two adjacent work cycles are displayed at the same time, the time display module 15 needs to clear up working time of operations in the last work cycle before the next work cycle. When each operation has been done, the controller 12 controls the HMI 11 to display the wave diagram of parameters of the operation in the time domain. At the end of each operation cycle, the controller 12 determines if the HMI 11 receives a parameter amending instruction. If the HMI 11 receives a parameter amending instruction, the HMI 11 displays a dialog box for inputting amendment information.

Figure 2:
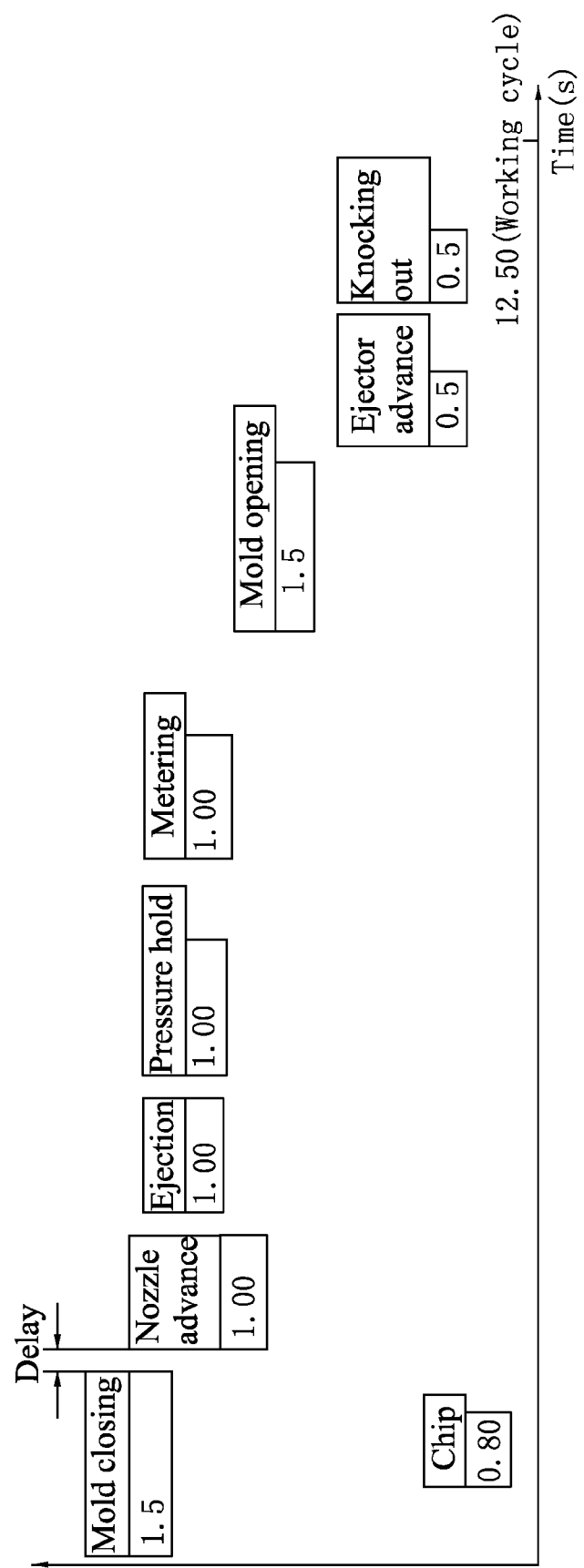
FIG. 2 is a scheme of display on a human machine interface of the injection molding machine in FIG. 1.

As shown in FIG. 2, for example, when the mold closing operation, the nozzle advance operation, the ejection operation, the pressure hold operation, the metering operation, the mold opening, and the ejector advance operation have been done, while the knocking out operation is doing, the HMI 11 displays the operations that have been done and the operation that is in process. Additionally, the HMI 11 further displays working time of each of the operations that have been done and the operation that is in process according to a time order, and the chip operation in the coordinate axis. For example, the working time of the mold closing operation is 1.5 seconds. Any operation can be combined with the chip operation for changing working time of the combined operation through changing the location of the chip operation. For example, the working time of the nozzle advance operation changes when the chip operation is moved behind the nozzle advance operation. After the location of the chip operation on the HMI 11 has been amended, the HMI 11 transmits an instruction to the controller 12 for changing working time of the combined operation in the controlling procedure.

Figure 3A:
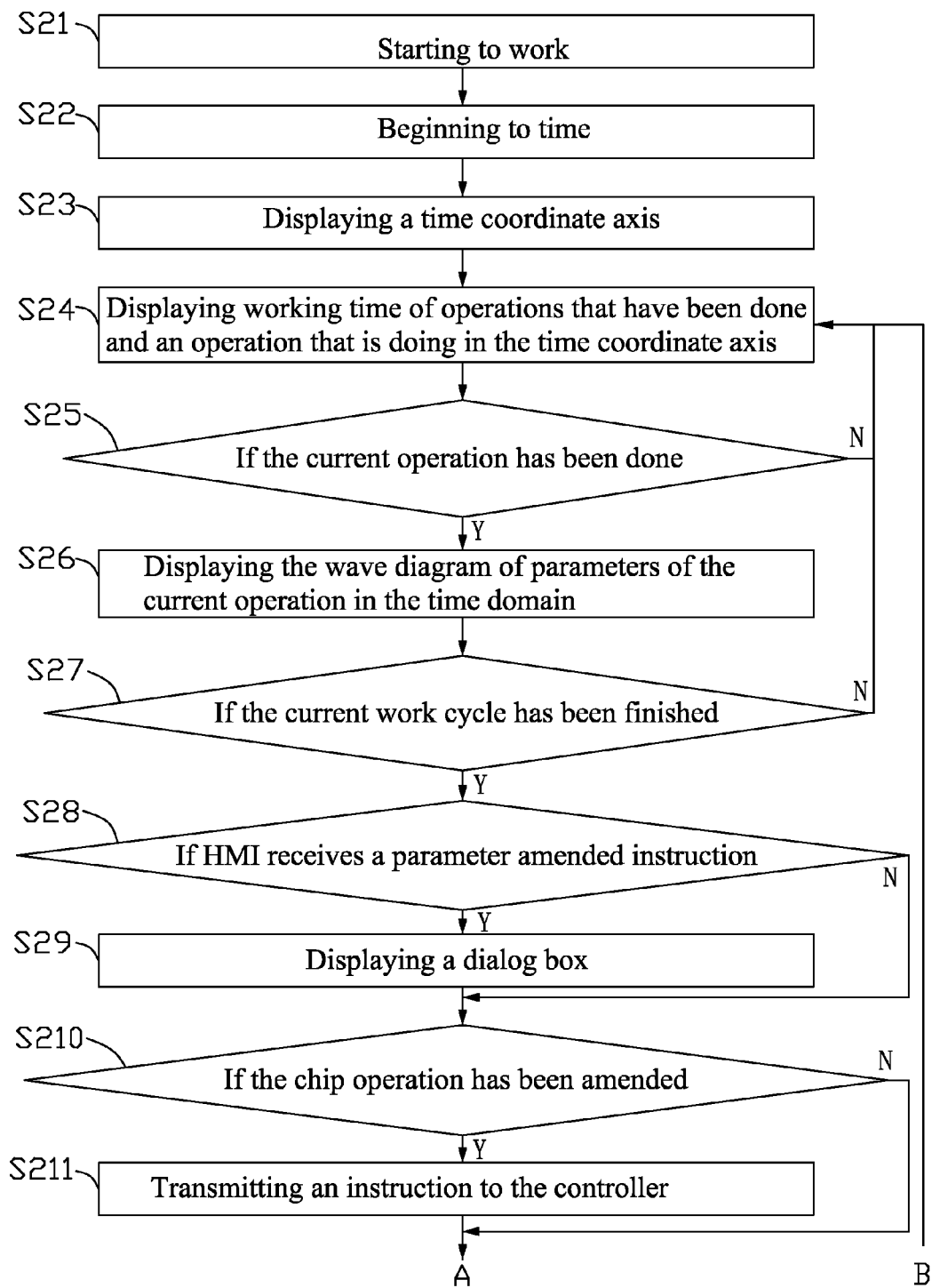
FIG. 3A is a part of a flowchart of an exemplary embodiment of a control method for controlling the display of an injection molding machine.
Figure 3B:
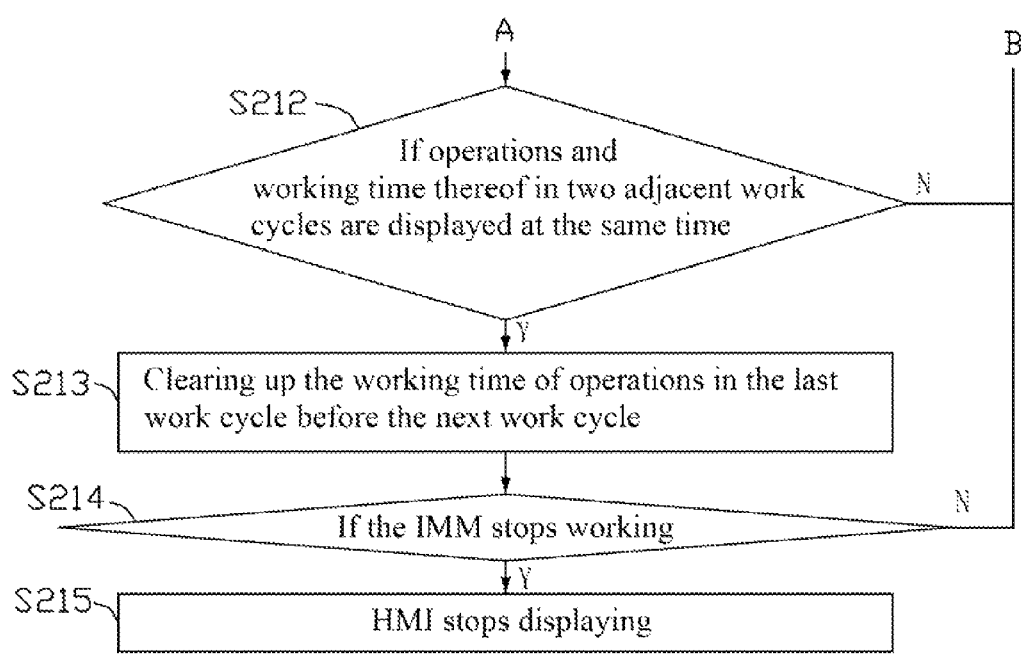
FIG. 3B is the continuing part of the flowchart of the control method of FIG. 3A.

Referring to FIGS. 3A and 3B, an embodiment of a control method for controlling display of an injection molding machine (IMM), includes the following steps.

In step S21, the controller 12 controls the HMI 11 to start to work.

In step S22, the controller 12 controls the timer 14 to begin to time.

In step S23, the time display module 15 controls the HMI 11 to display a time coordinate axis for a current work cycle for the IMM.

In step S24, the time display module 15 controls the HMI 11 to display working times of operations that have been done and an operation that is in process in the current work cycle according to a time order in the time coordinate axis.

In step S25, the controller 12 determines if the current operation has been done; if the current operation has been done, the procedure goes to step S26, otherwise, the procedure returns to step S24.

In step S26, the time display module 15 controls the HMI 11 to display the wave diagram of parameters of the current operation in the time domain.

In step S27, the controller 12 determines if the current work cycle has been finished; if the current work cycle has been finished, the procedure goes to step S28, otherwise, the procedure returns to step S24.

In step S28, the controller 12 determines if the HMI 11 receives a parameter amending instruction; if the HMI 11 receives a parameter amending instruction, the procedure goes to step S29, otherwise, the procedure goes to step S210.

In step S29, the HMI 11 displays a dialog box for inputting amendment information to amend parameters.

In step S210, the controller 12 determines if the chip operation has been amended; if the chip operation has been amended, the procedure goes to step S211, otherwise, the procedure goes to step S212.

In step S211, the HMI 11 transmits an instruction to the controller 12 for changing working time of an operation combined with the chip operation in the controlling procedure.

In step S212, the controller 12 determines if operations and working time of the operations in two adjacent work cycles are displayed on the HMI 11 at the same time; if operations and working times of the operations in two adjacent work cycles are displayed on the HMI 11 at the same time, the procedure goes to step S213, otherwise, the procedure returns to the step S24.

In step S213, the time display module 15 controls the HMI 11 to clear up the working time of operations in the last work cycle before the next work cycle.

In step S214, the controller 12 determines if the IMM has stopped working; if the IMM has stopped working, the HMI 11 stops displaying operation information, otherwise, the procedure returns to step S24.

The foregoing description of the certain inventive embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skill in the art to which the present disclosure pertains without departing from its spirit and scope. Accordingly, the scope of the present disclosure is defined by the appended claims rather than the foregoing description and the embodiments described therein.

What is claimed is:

1. A control system for controlling display of an injection molding machine (IMM), the control system comprising:
   a human machine interface (HMI);
   a driver configured for driving the IMM to perform a plurality of operations in an injection molding work cycle of the IMM, wherein the plurality of operations comprises at least one chip operation, wherein the at least one chip operation is an auxiliary operation selectively combined with each of the plurality of operations for changing working times of the combined operations, and the HMI transmits an instruction to the controller for changing working time of the combined operations in response to receiving a chip operation parameter amending instruction at the end of each work cycle;
   a controller configured for controlling the driver;
   a timer configured for timing and recording working time of each of the plurality of operations in real time; and
   a time display module configured for controlling the HMI to simultaneously display the working times of the operations that have been done and the operation in process of the current injection molding work cycle in a graphical way to correspond to the timing and the duration of each of the plurality of operations, wherein the working times of the operations are graphically distinct from each other, and wherein the working time of the operation in process is displayed in real time.

2. The control system of claim 1, wherein the time display module is further configured for controlling the HMI to display a time coordinate axis for the current work cycle of the IMM.

3. The control system of claim 2, further comprising an operation display module for controlling the IMM to display operations that have been done and the operation that is in process in the time coordinate axis, wherein the operation display module is capable of controlling the HMI to display the wave diagram of parameters of a current operation in the time domain after the current operation has been done.

4. The control system of claim 2, wherein the time display module is further configured for controlling the HMI to display a time coordinate axis for the last work cycle for the IMM, to display working times of the operations of the last work cycle; the working time of the operations of the last work cycle recorded by the timer is erased at the end of the current work cycle before starting the next work cycle.

5. The control system of claim 1, wherein the HMI displays a dialog box in response to receiving a parameter amending instruction for amending the parameter.

6. The control system of claim 1, wherein the HMI transmits a control instruction to the controller in response to that the chip operation has been amended.

7. The control system of claim 1, wherein the plurality of operations further comprises a closing operation, a nozzle advance operation, an ejection operation, a pressure hold operation, a metering operation, a mold opening, an ejector advance operation, and a knocking out operation.

8. A control method for controlling display of an injection molding machine (IMM), the control method comprising:
   timing working times of a plurality of operations in an injection molding work cycle of the IMM in real time via a timer, wherein the plurality of operations comprises at least one chip operation, wherein the at least one chip operation is an auxiliary operation selectively combined with each of the plurality of operations for changing the working times of the combined operations;
   displaying the working times of each of the operations that have been done and the operation in process of the current injection molding work cycle simultaneously corresponding to the timing and the duration of the plurality of operations in a graphical way via a time display module configured to control a human-machine interface (HMI), wherein the working times of the operations are displayed as graphically distinct from each other, and the working time of the operation in process is displayed in real time;
   determining if the HMI receives a parameter amending instruction at the end of each operation cycle, and displaying a dialog box via the HMI in response to receiving a parameter amending instruction to amend the parameter; and
   determining if a chip operation has been amended at the end of each work cycle, and
   controlling the HMI to transmit a control instruction in response to receiving a chip operation parameter amending instruction at the end of each work cycle.

9. The control method of claim 8, further comprising:
   controlling the HMI to display a time coordinate axis for the current work cycle of the IMM via the time display module; and
   controlling the IMM to display the operation have been done and the operation in process in the time coordinate axis via an operation display module.

10. The control method of claim 9, further comprising:
    determining if the current operation has been done, and controlling the HMI to display the wave diagram of parameters of the current operation in the time domain after the current operation has been done.

11. The control system of claim 1, wherein the time display module is configured for using separate blocks to represent the working times of the operations, such that the working times of the operations are graphically distinct from each other.

12. The control method of claim 8, further comprising:
transmitting an instruction for changing working time of the operation combined with the chip operation to the controller via the HMI in response to the combination.

13. The control method of claim 8, wherein the plurality of operations further comprises a closing operation, a nozzle advance operation, an ejection operation, a pressure hold operation, a metering operation, a mold opening, an ejector advance operation, and a knocking out operation.

* * * * *